United States Patent
Dudar

(10) Patent No.: US 10,012,183 B2
(45) Date of Patent: *Jul. 3, 2018

(54) SYSTEM AND METHODS FOR PURGING RESIDUAL EXHAUST AND UNCOMBUSTED FUEL TO AN EXHAUST CATALYST

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 258 days.

This patent is subject to a terminal disclaimer.

(21) Appl. No.: 14/701,094

(22) Filed: Apr. 30, 2015

(65) Prior Publication Data

US 2016/0319718 A1    Nov. 3, 2016

(51) Int. Cl.
| | |
|---|---|
| F01N 3/00 | (2006.01) |
| F02M 25/08 | (2006.01) |
| F02D 41/04 | (2006.01) |
| F02D 41/00 | (2006.01) |
| F02N 19/00 | (2010.01) |

(52) U.S. Cl.
CPC ............ F02M 25/089 (2013.01); F01N 3/00 (2013.01); F02D 41/0035 (2013.01); F02D 41/042 (2013.01); F01N 2590/11 (2013.01); F02D 41/006 (2013.01); F02D 2041/0095 (2013.01); F02D 2200/0802 (2013.01); F02N 19/005 (2013.01); Y02T 10/20 (2013.01)

(58) Field of Classification Search
CPC .. F02D 41/003; F02D 41/0035; F02D 41/004; F02D 41/006; F02D 41/0077; F02D 41/042; F02D 2041/0095; F02D 2200/0802; F02D 29/02; F02D 13/0207; F02M 25/089; F02M 25/0836; F02M 33/025; F02M 26/23; F02N 11/04; F02N 19/005; F01N 3/00; Y02T 10/20; Y02T 10/47

USPC .................................................... 60/283, 285

See application file for complete search history.

(56) References Cited

U.S. PATENT DOCUMENTS

| | | | |
|---|---|---|---|
| 5,239,970 A | 8/1993 | Kurihara | |
| 6,763,298 B2* | 7/2004 | Boggs | B60K 6/445 123/198 DB |
| 6,971,357 B2* | 12/2005 | Grieser | F01L 1/34 123/179.18 |

(Continued)

OTHER PUBLICATIONS

Dudar, Aed M. et al., "Systems and Methods for Detection and Mitigation of Liquid Fuel Carryover in an Evaporative Emissions System," U.S. Appl. No. 14/795,558, filed Jul. 9, 2015, 42 pages.

(Continued)

*Primary Examiner* — Phutthiwat Wongwian
*Assistant Examiner* — Diem Tran
(74) *Attorney, Agent, or Firm* — Julia Voutyras; McCoy Russell LLP

(57) ABSTRACT

A method for an engine is provided. Following an engine-off event, engine cylinders are sequentially positioned with an intake valve open and an exhaust valve open. The contents of the engine cylinder are then purged to an exhaust catalyst. In this way, existing vehicle hardware may be used to evacuate residual hydrocarbons and uncombusted fuel to the exhaust catalyst, provided the catalyst remains above the light-off temperature.

8 Claims, 7 Drawing Sheets

(56) References Cited

U.S. PATENT DOCUMENTS

| | | | |
|---|---|---|---|
| 7,051,514 B2* | 5/2006 | Midlam-Mohler | B60K 6/48 60/278 |
| 7,107,759 B2* | 9/2006 | Annoura | F02D 41/0032 123/518 |
| 7,607,293 B2 | 10/2009 | Tamai et al. | |
| 2006/0266323 A1* | 11/2006 | Ogimura | F02D 35/02 123/198 A |
| 2011/0083423 A1* | 4/2011 | Kadowaki | F02D 41/0002 60/276 |

OTHER PUBLICATIONS

Dudar, Aed M., "System and Methods for Preventing Hydrocarbon Breakthrough Emissions," U.S. Appl. No. 14/860,421, filed Sep. 21, 2015, 51 pages.

Dudar, Aed M., "Systems and Methods for Detection and Mitigation of Liquid Fuel Carryover in an Evaporative Emissions System," U.S. Appl. No. 14/939,672, filed Nov. 12, 2015, 54 pages.

Dudar, A. "System and Methods for Purging Residual Exhaust and Uncombusted Fuel to a Fuel Vapor Canister," U.S. Appl. No. 14/810,177, filed Jul. 27, 2015, 48 pages.

Dudar, A., "Systems and Methods for Purging Residual Exhaust and Uncombusted Fuel to a Fuel Vapor Canister" U.S. Appl. No. 14/606,779, filed Jan. 27, 2015, 52 pages.

* cited by examiner

SYSTEM AND METHODS FOR PURGING RESIDUAL EXHAUST AND UNCOMBUSTED FUEL TO AN EXHAUST CATALYST

FIELD

The present description relates generally to methods and systems for controlling a vehicle engine to reduce engine emissions following vehicle shutdown.

BACKGROUND/SUMMARY

In plug-in hybrid electric vehicles (PHEVs), the fuel vapor canister primarily adsorbs refueling vapors, as refueling and diurnal vapors are sealed within the fuel tank by a fuel tank isolation valve. An air intake system hydrocarbon (AIS HC) trap may capture hydrocarbons emitted by leaky injectors for from fuel that may puddle in intake. The AIS HC trap may also capture uncombusted fuel that is trapped within the engine cylinders themselves. An AIS trap is required for vehicles to be classified as practically zero emissions vehicles (PZEVs).

However, depending on the position of the cylinder intake and exhaust valves when the engine is shut off, the uncombusted fuel may migrate to either the engine intake or the exhaust manifold and may then escape to atmosphere. This may both increase a vehicle's emissions and cause a vehicle to fail emissions certification testing.

Previous solutions to this problem involve the utilization of secondary air injection methods to reduce the escape of uncombusted and partially combusted hydrocarbons to atmosphere at a subsequent vehicle-on event. For example, U.S. Pat. No. 6,971,357 describes a method wherein a secondary air pump provides fresh air to scavenge exhaust from engine cylinders upon engine shutdown. However, secondary air injection adds additional hardware and complexity to the vehicle.

In one example, a method for an engine is provided, comprising following an engine-off event, positioning a first engine cylinder with an intake valve open and an exhaust valve open and purging contents of the first engine cylinder to an exhaust catalyst. In this way, existing vehicle hardware may be used to evacuate residual hydrocarbons and uncombusted fuel to the exhaust catalyst, provided the catalyst remains above the light-off temperature. As one example, a reversible vacuum pump coupled within an evaporative leak check module may be used to pressurize the engine intake when a canister purge valve is opened. This may further allow fuel vapor stored in a fuel vapor canister to be purged to the exhaust catalyst, decreasing bleed emissions without requiring an additional bleed canister coupled between the fuel vapor canister and atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
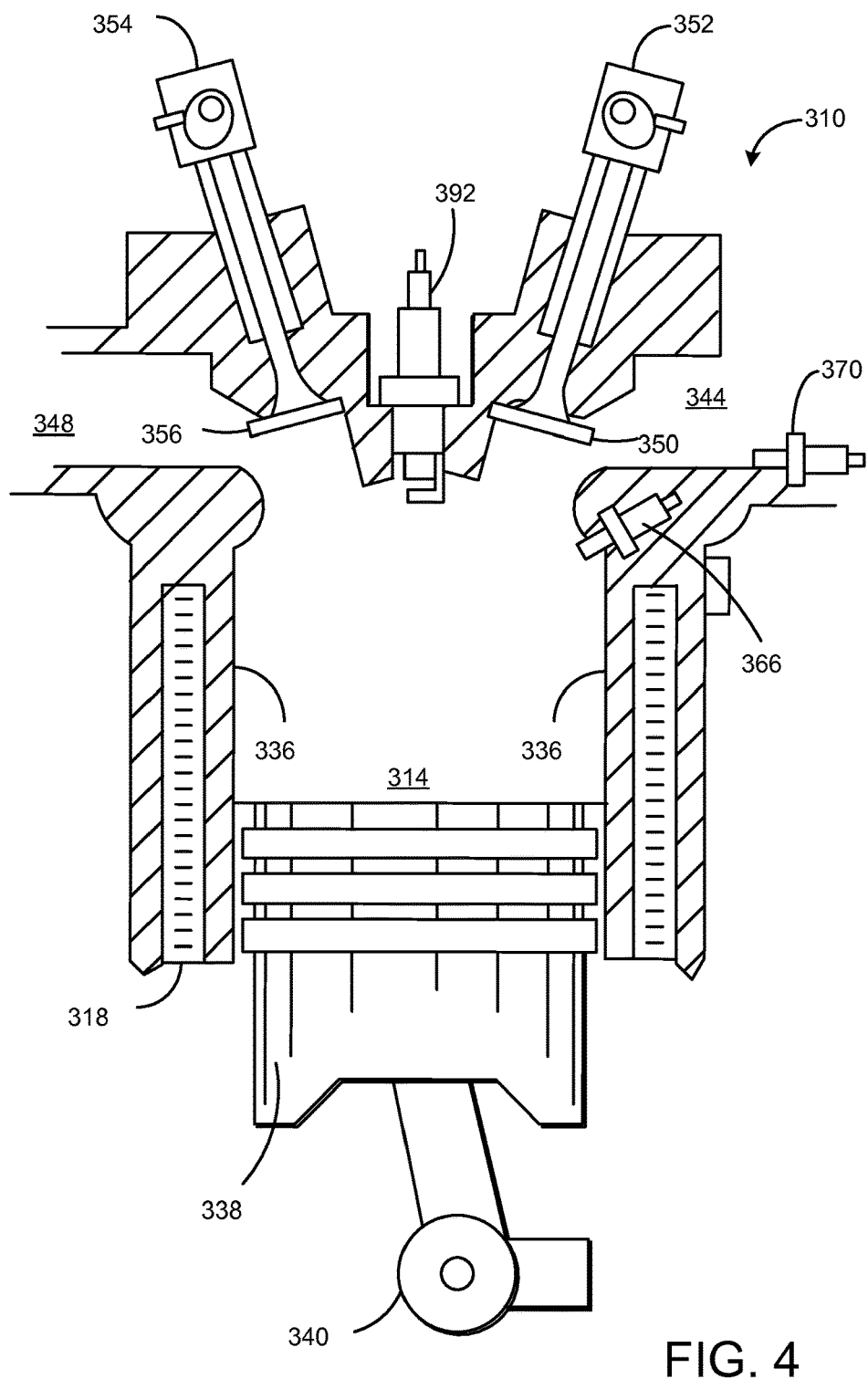
FIG. 4 schematically shows an example combustion cylinder with an open intake valve and an open exhaust valve.
Figure 5:
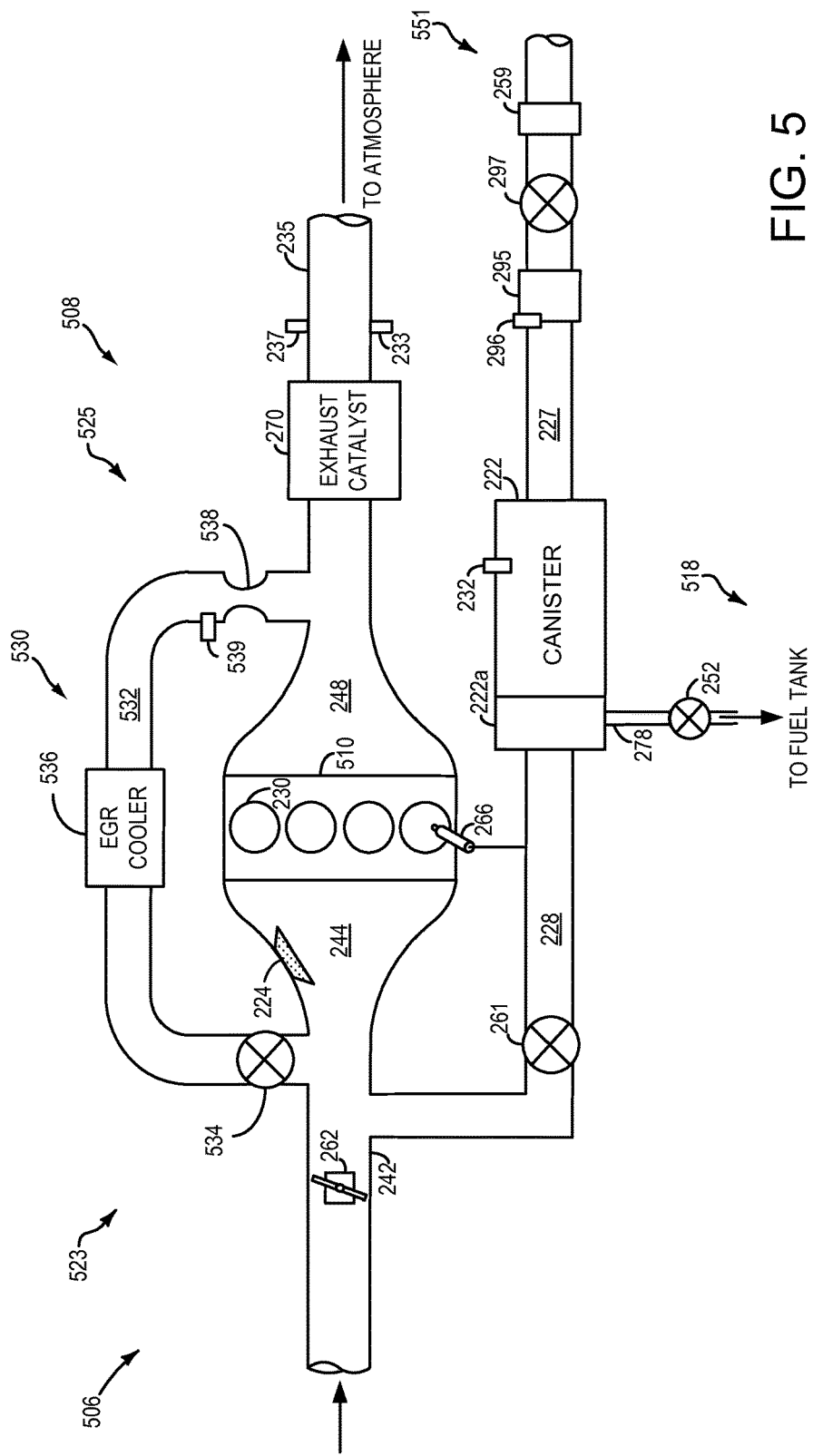
FIG. 5 schematically shows an example engine system with an exhaust gas recirculation system.
Figure 6:
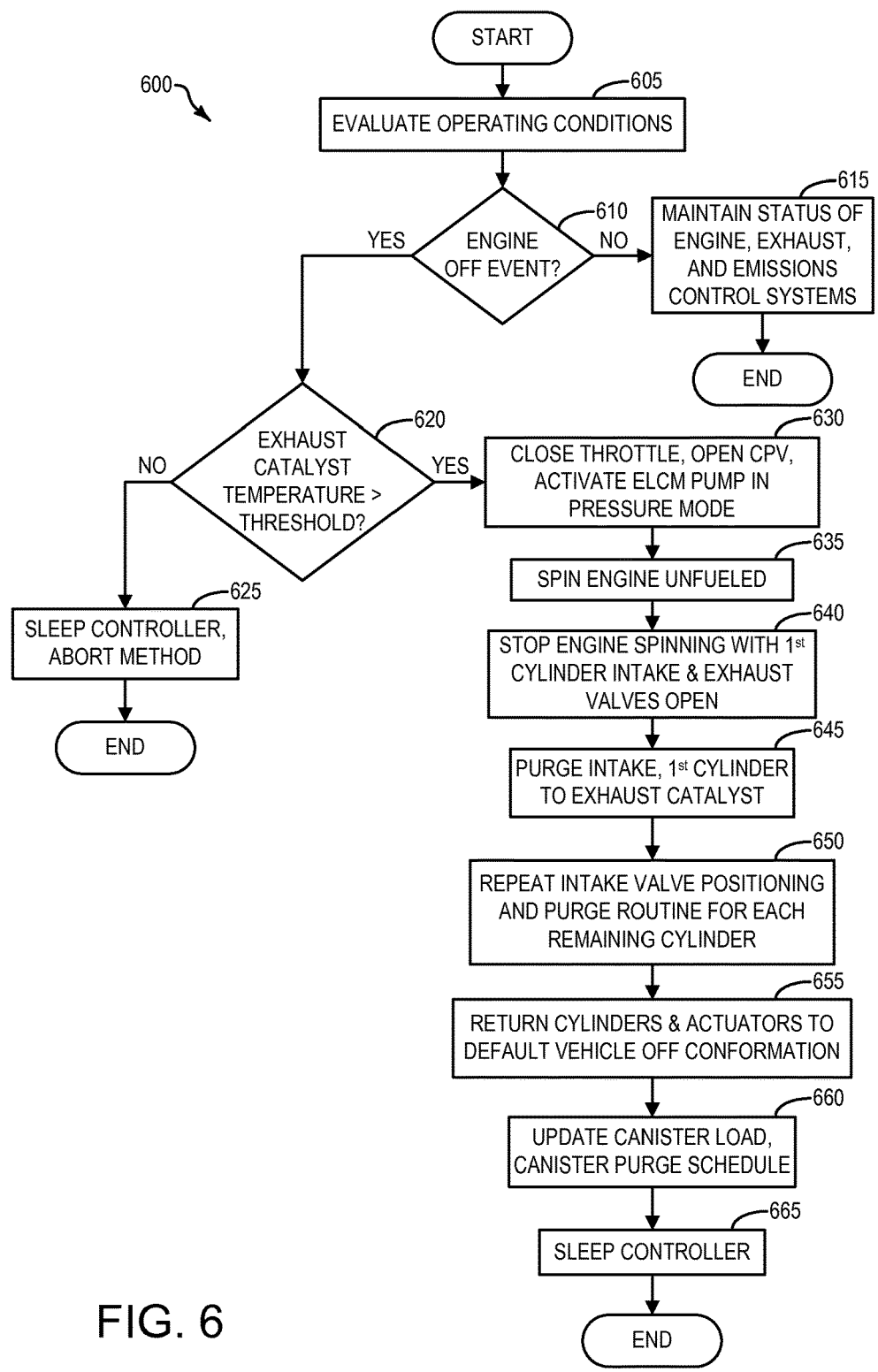
FIG. 6 shows a flowchart for a high level method for evacuating uncombusted fuel and residual hydrocarbons to an exhaust catalyst.
Figure 7:
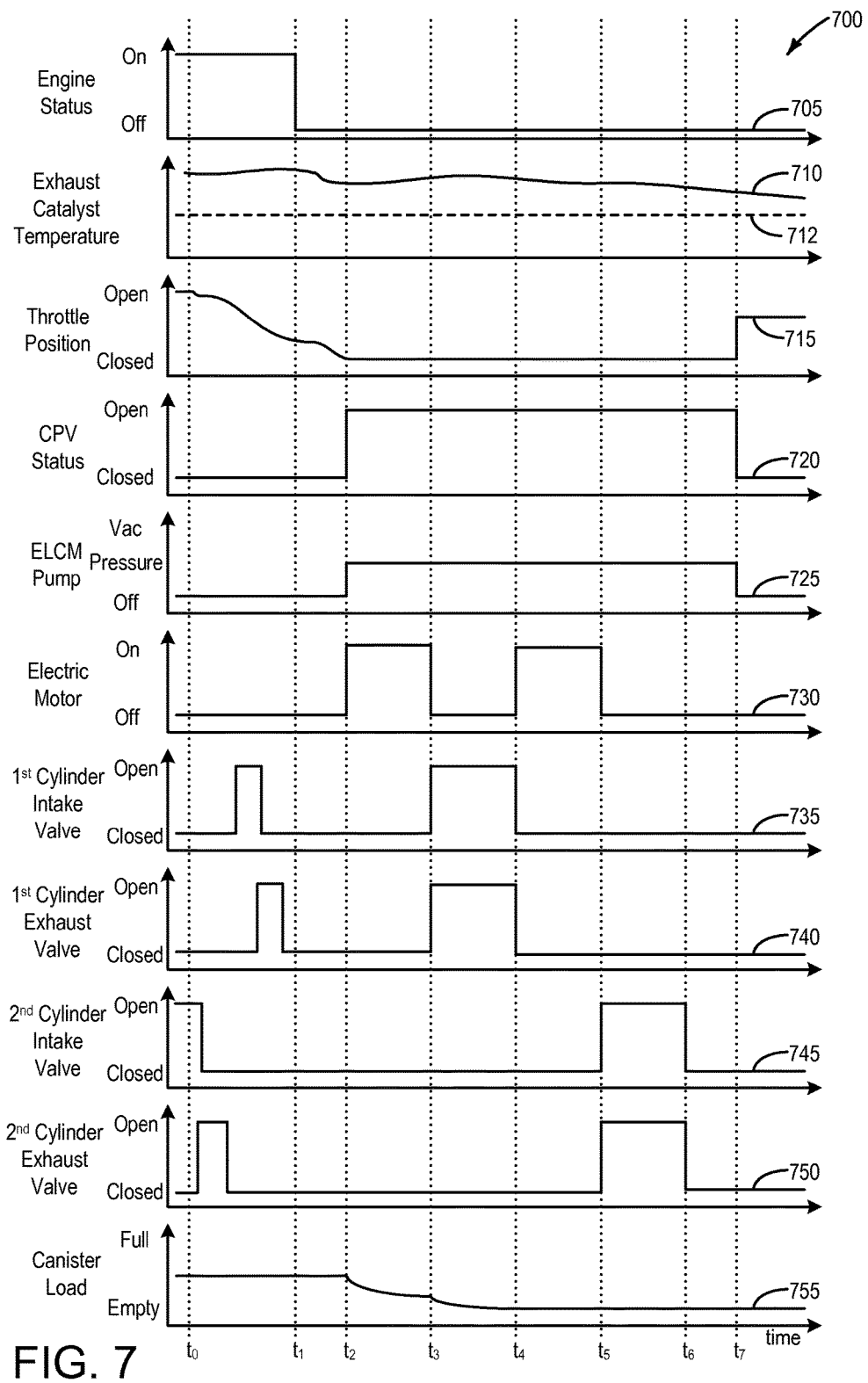
FIG. 7 shows an example timeline for evacuating uncombusted fuel and residual hydrocarbons to an exhaust catalyst following an engine-off event according to the method of FIG. 6.

This detailed description relates to systems and methods for purging exhaust gas and uncombusted fuel to an exhaust catalyst following a vehicle-off condition. Specifically, the description relates to applying pressurized air to engine cylinders while positioning each cylinder with intake and exhaust valves in an open conformation. The system and methods may be applied to a vehicle system capable of spinning an engine unfueled with an electric motor, such as the hybrid vehicle system depicted in FIG. 1. The engine may be coupled to an emissions control system and an exhaust system, as depicted in FIG. 2. The engine may comprise a plurality of combustion cylinders, such as the combustion cylinder depicted in FIG. 3. During a vehicle-off condition, the engine may be spun unfueled and stopped with both the intake valve and the exhaust valve open, as shown in FIG. 4. In this conformation, the exhaust system is coupled to the intake system. If air pressure is applied to the intake system in this conformation, exhaust within the exhaust manifold and exhaust line may be forced into the exhaust catalyst. In engines employing an exhaust gas recirculation system, such as the engine system depicted in FIG. 5, an exhaust gas recirculation valve may be opened to couple the engine intake to the engine exhaust. A method for evacuating the engine cylinders and engine exhaust is depicted in FIG. 6. A timeline for evacuating uncombusted fuel and residual exhaust to an exhaust catalyst using the method of FIG. 6 is shown in FIG. 7.

Figure 1:
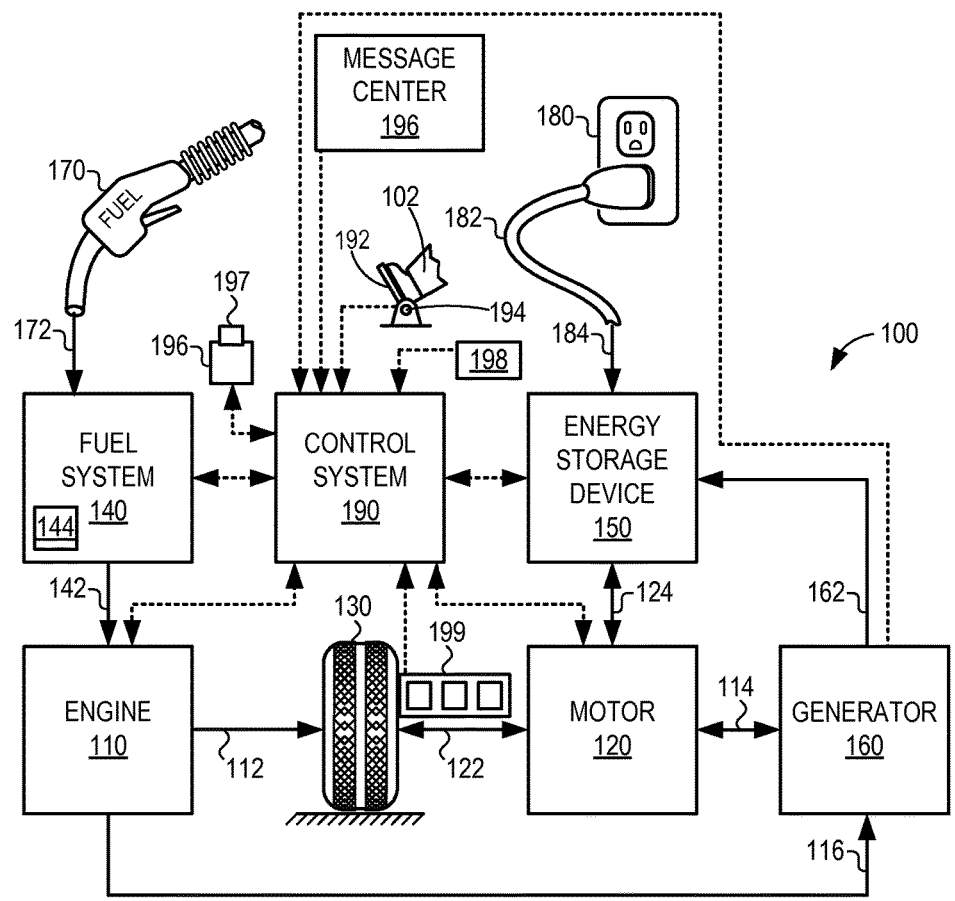
FIG. 1 schematically shows an example vehicle propulsion system.
Figure 2:
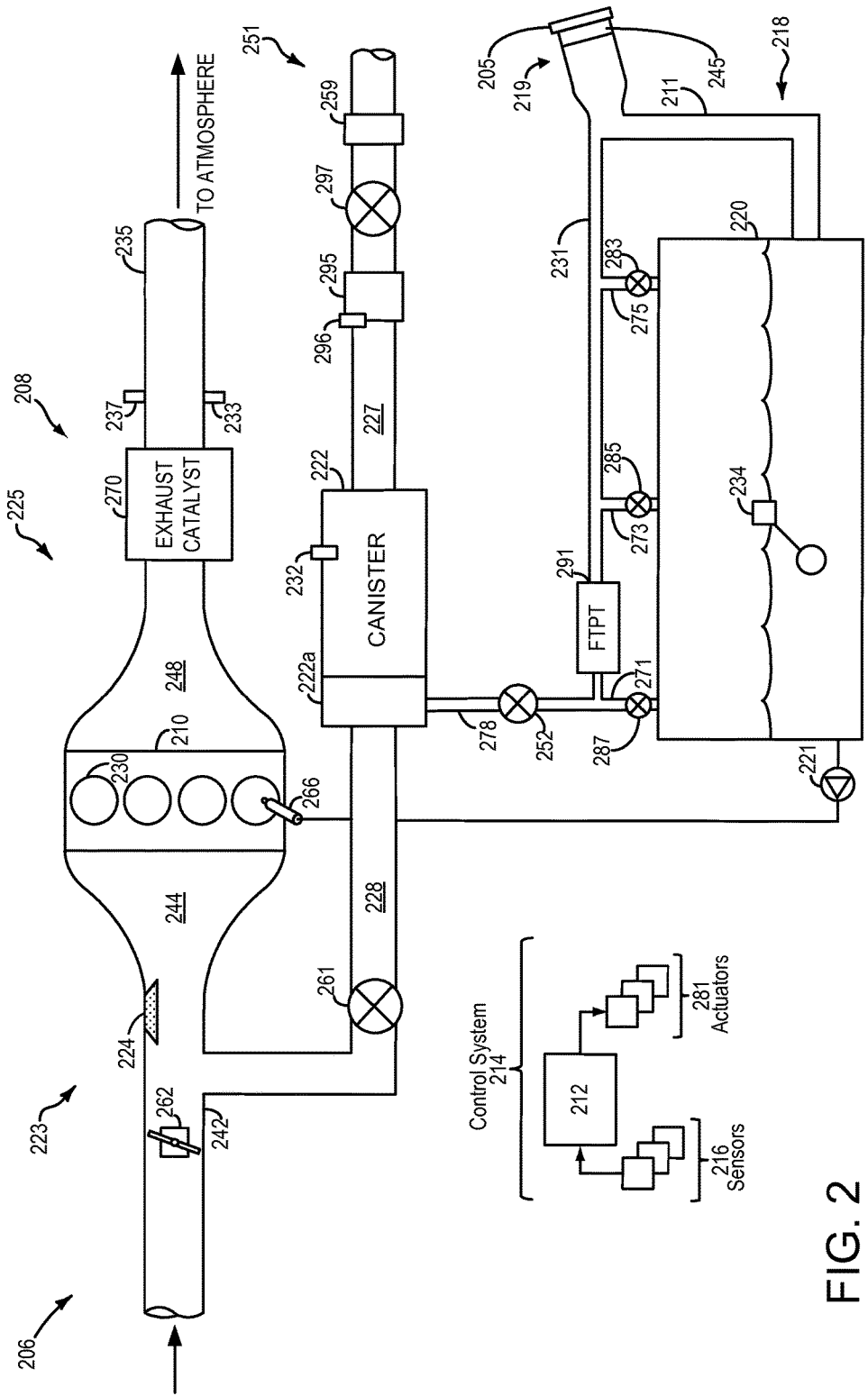
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 6, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 6.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3:
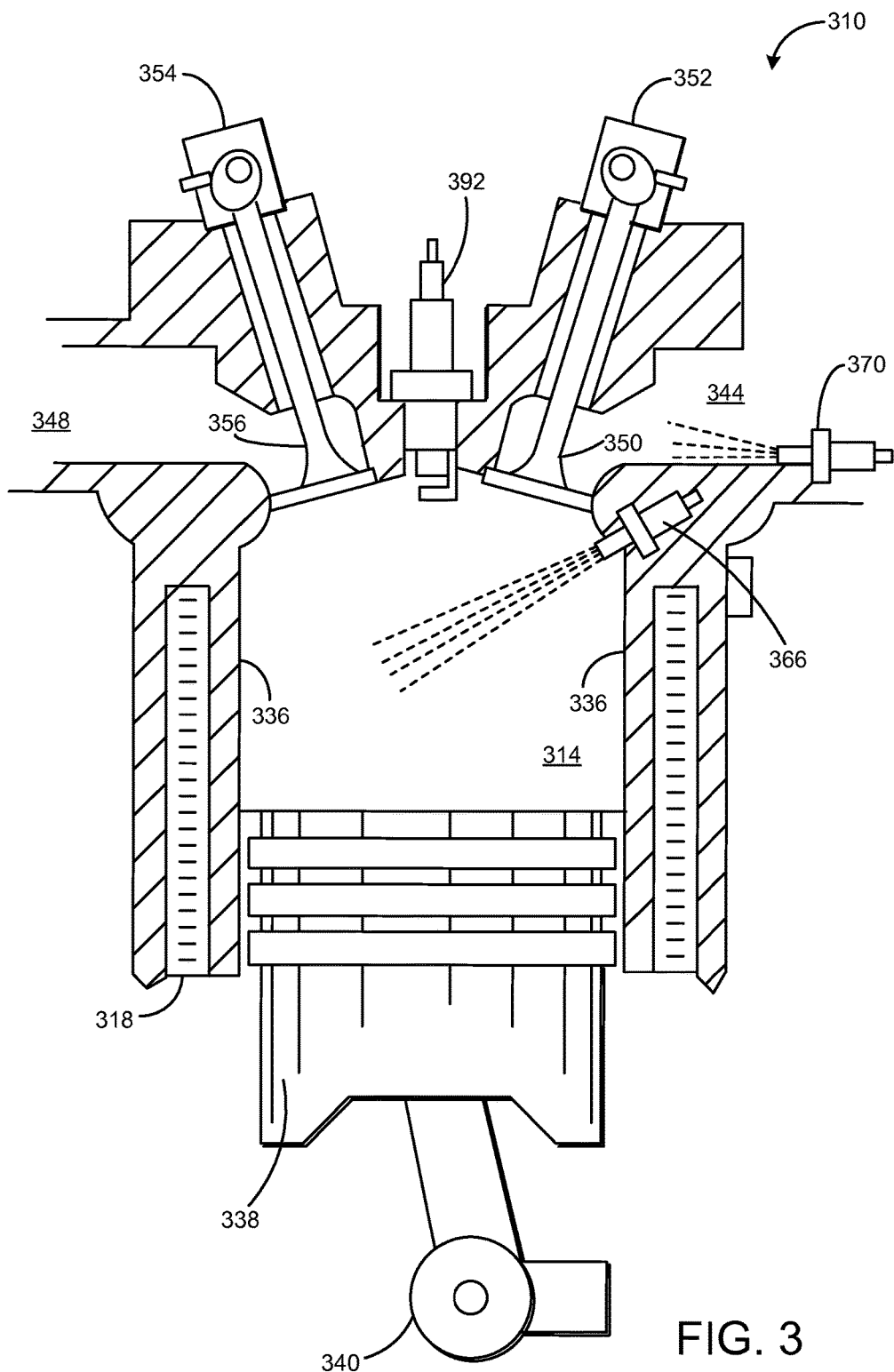
FIG. 3 schematically shows an example combustion cylinder for an engine.

FIG. 3 depicts an example embodiment of a combustion chamber or cylinder that may be included in engine 310, which may be configured similarly to engine 110 as described herein, and depicted in FIG. 1 and/or engine 210, as described herein and depicted in FIG. 2. Cylinder (i.e. combustion chamber) 314 may include combustion chamber walls 336 with piston 338 positioned therein. Piston 338 may be coupled to crankshaft 340 so that reciprocating motion of the piston is translated into rotational motion of the crankshaft. Crankshaft 340 may be coupled to at least one drive wheel of the passenger vehicle via a transmission system. Further, a starter motor may be coupled to crankshaft 340 via a flywheel to enable a starting operation of engine 310, and/or to rotate the engine in an unfueled mode.

Cylinder 314 can receive intake air via intake air passage 344, which may be one of a plurality of intake air passages coupled to cylinder 314. Intake air passage 344 may communicate with other cylinders of engine 310 in addition to cylinder 314. In some embodiments, one or more of the intake passages may include a boosting device such as a turbocharger or a supercharger. Exhaust passage 348 can receive exhaust gases from cylinder 314 as well as from other cylinders of engine 310.

Each cylinder of engine 310 may include one or more intake valves and one or more exhaust valves. For example, cylinder 314 is shown including at least one intake poppet valve 350 and at least one exhaust poppet valve 356 located at an upper region of cylinder 314. In some embodiments, each cylinder of engine 310, including cylinder 314, may include at least two intake poppet valves and at least two exhaust poppet valves located at an upper region of the cylinder.

Intake valve 350 may be controlled by a controller via actuator 352. Similarly, exhaust valve 356 may be controlled by a controller via actuator 354. During some conditions, the controller may vary the signals provided to actuators 352 and 354 to control the opening and closing of the respective intake and exhaust valves. The position of intake valve 350 and exhaust valve 356 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 314 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 314 can have a compression ratio, which is the ratio of volumes when piston 338 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 310 may include a spark plug 392 for initiating combustion. An ignition system (not shown) can provide an ignition spark to cylinder 314 via spark plug 392 in response to a spark advance signal from a controller, under select operating modes. However, in some embodiments, spark plug 392 may be omitted, such as where engine 310 may initiate combustion by auto-ignition or by injection of fuel as may be the case with some diesel engines.

In some embodiments, each cylinder of engine 310 may be configured with one or more fuel injectors for providing fuel thereto. As a non-limiting example, cylinder 314 is shown including two fuel injectors 366 and 370. Fuel injector 366 is shown coupled directly to cylinder 314 for injecting fuel directly therein in proportion to a pulse width of a signal received from a controller via an electronic driver. In this manner, fuel injector 366 provides what is known as direct injection (hereafter referred to as "DI") of fuel into cylinder 314. While FIG. 3 shows injector 366 as a side injector, it may also be located overhead of the piston, such as near the position of spark plug 392. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 366 from a high pressure fuel system including a fuel tank, fuel pumps, a fuel rail, etc., as depicted in FIG. 2. Alternatively, fuel may be delivered by a single stage fuel pump at lower pressure, in which case the timing of the direct fuel injection may be more limited during the compression stroke than if a high pressure fuel system is used.

Fuel injector 370 is shown arranged in intake air passage 344, rather than in cylinder 314, in a configuration that provides what is known as port injection of fuel (hereafter referred to as "PFI") into the intake port upstream of cylinder 314. Fuel injector 370 may inject fuel in proportion to a pulse width of a signal received from a controller via an electronic driver.

Fuel may be delivered by both injectors to the cylinder during a single cycle of the cylinder. For example, each injector may deliver a portion of a total fuel injection that is combusted in cylinder 314. Further, the distribution and/or relative amount of fuel delivered from each injector may vary with operating conditions such as described herein below. The relative distribution of the total injected fuel among injectors 366 and 370 may be referred to as a first injection ratio. For example, injecting a larger amount of the fuel for a combustion event via (port) injector 370 may be an example of a higher first ratio of port to direct injection, while injecting a larger amount of the fuel for a combustion event via (direct) injector 366 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 3 shows only one cylinder of a multi-cylinder engine. As such each cylinder may similarly include its own set of intake/exhaust valves, fuel injector(s), spark plug, etc.

Fuel injectors 366 and 370 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 370 and 366, different effects may be achieved. Fuel injectors 366 and 370 may be configured to inject fuel from the same fuel tank, from different fuel tanks, from a plurality of the same fuel tanks, or from an overlapping set of fuel tanks.

For PHEVs, the fuel vapor canister primarily adsorbs refueling vapors, as refueling and diurnal vapors are sealed within the fuel tank by the FTIV. The AIS HC trap may capture hydrocarbons emitted by leaky injectors for from fuel that may puddle in intake. The AIS HC trap may also capture uncombusted fuel that is trapped within the engine cylinders themselves. However, depending on the position of the cylinder intake and exhaust valves when the engine is shut off, the uncombusted fuel may migrate to either the engine intake or the exhaust manifold and may then escape to atmosphere. This may cause a vehicle to fail emissions certification testing. However, the inventors herein have recognized that a reversible ELCM vacuum pump may be used to pressurize the engine combustion pathways, thus flushing uncombusted fuel and/or exhaust gasses into the exhaust catalyst. In scenarios where the exhaust catalyst remains above the light-off temperature at an engine-off event, these hydrocarbons may be processed into less hazardous gasses, thus decreasing the potential for the uncombusted hydrocarbons to be emitted to atmosphere. Further, any hydrocarbons bound within the fuel vapor canister and/or AIS hydrocarbon trap may be desorbed and flushed to the exhaust catalyst, thus decreasing the potential for bleed emissions following one or more diurnal soaks.

For HEVs and other vehicles which couple the engine drive train to an electric motor that can be powered by a battery, the engine may be spun unfueled and at a low speed using the electric motor. This action also generates heat, which may cause liquid fuel within the cylinders to vaporize. The fuel vapor may then be driven to the exhaust catalyst. For vehicles that are configured with dual independent variable cam timing systems, or other means of independently controlling both the intake valve and exhaust valve, the engine may be stopped in a position where both the intake valve and the exhaust valve are open simultaneously. This conformation is shown in FIG. 4, where both intake valve 350 and exhaust valve 356 are open. In this way, exhaust passage 348 is coupled to intake air passage 344 via cylinder 314. With the CPV open, the ELCM vacuum pump may then be used to pressurize the intake air passage and the combustion cylinder, thus evacuating any residual exhaust to the exhaust catalyst. The process may be repeated until all cylinders are purged, and then the engine may be returned to a default conformation.

In some examples, the vehicle may include an exhaust gas recirculation (EGR) system including an active EGR valve. For vehicles that do not include dual independent VCT systems, this may provide an alternative means for coupling the exhaust manifold to the ELCM vacuum pump so that exhaust gas trapped within the exhaust manifold and exhaust line may be drawn into the fuel vapor canister. FIG. 5 shows a schematic depiction of a vehicle system 506. The vehicle system 506 includes an engine system 508 coupled to an emissions control system 551 and a fuel system 518. In some examples, vehicle system 506 may be a hybrid electric vehicle system.

Similarly to engine system 208 described herein and depicted in FIG. 2, engine system 508 may include an engine 510 having a plurality of cylinders 230. The engine 510 includes an engine intake 523 and an engine exhaust 525. The engine intake 523 includes a throttle 262 fluidly coupled to the engine intake manifold 244 via an intake passage 242. The engine exhaust 525 includes an exhaust manifold 248 leading to an exhaust passage 235 that routes exhaust gas to the atmosphere. The engine exhaust 525 may include one or more exhaust catalysts 270, which may be mounted in a close-coupled position in the exhaust.

Engine system 508 may also include an exhaust gas recirculation (EGR) system 530 that receives a portion of an exhaust gas stream exiting engine 510 and returns the exhaust gas to engine intake manifold 244 downstream of throttle 262. Under some conditions, EGR system 530 may be used to regulate the temperature and or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 530 is shown forming a common EGR passage 532 from exhaust passage 235 to intake passage 242.

In some examples, exhaust system 525 may also include a turbocharger (not shown) comprising a turbine and a compressor coupled on a common shaft. The turbine may be coupled within exhaust passage 235, while the turbine may be coupled within intake passage 242. The blades of the turbine may be caused to rotate about the common shaft as a portion of the exhaust gas stream discharged from engine 510 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 510. In systems where EGR passage 532 is coupled to engine exhaust 525 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system).

An EGR valve 534 may be coupled within EGR passage 532. EGR valve 534 may be configured as an active solenoid valve that may be actuated to allow exhaust gas flow into intake manifold 244. The portion of the exhaust gas flow discharged by engine 510 that is allowed to pass through EGR system 530 and returned to engine 510 may be metered by the measured actuation of EGR valve 534 which may be controlled by a controller. The actuation of EGR valve 534 may be based on various vehicle operating parameters and a calculated overall EGR flow rate.

One or more EGR coolers 536 may be coupled within EGR passage 532. EGR cooler 536 may act to lower the overall temperature of the EGR flow stream before passing the stream on to air intake manifold 244 via where it may be combined with fresh air and directed to engine 510. EGR passage 532 may include one or more flow restriction regions 538. One or more pressure sensors 539 may be coupled at or near flow restriction region 538. The diameter of the flow restriction region may thus be used to determine an overall volumetric flow rate through EGR passage 532.

To evacuate engine exhaust 525, EGR valve 534 may be commanded open while CPV 261 is open and ELCM 295 is pumping fresh air to the fuel vapor canister. In this way, exhaust within exhaust manifold 248, exhaust passage 235, and EGR passage 532 may be directed to exhaust catalyst 270.

FIG. 6 shows a flow chart for an example high-level method 600 for evacuating uncombusted fuel and exhaust in a hybrid-electric vehicle. More specifically, method 600 may be used to reduce vehicle emissions by using a vacuum pump to evacuate the contents of the fuel vapor canister, engine cylinders, and exhaust passages to the exhaust catalyst. Method 600 will be described with regard to the systems described herein and depicted in FIGS. 1-5, though it should be understood that method 600 may be applied to other systems without departing from the scope of this disclosure. Instructions for carrying out method 600 may be executed by a controller based on instructions stored in non-transitory memory of the controller and in conjunction with signals received from sensors of the engine system, such as the sensors described above with reference to FIG. 1. The controller may employ engine actuators of the engine system to adjust engine operation, according to the methods described below.

Method 600 begins at 605. At 605, method 600 includes evaluating operating conditions. Operating conditions may be measured, estimated, or inferred. Operating conditions may include various vehicle conditions, such as vehicle speed, vehicle location, etc., various engine conditions, such as engine speed, engine load, engine status, etc., various fuel system conditions, such as fuel level, fuel tank pressure, canister load, etc., various ambient conditions, such as ambient temperature, humidity, barometric pressure, etc., and other relevant operating conditions.

Continuing at 610, method 600 includes determining whether an engine-off event has occurred. An engine-off event may be indicated by a vehicle-off event, such as a key-off event, a user setting a vehicle alarm following exiting a vehicle that has been parked, or other suitable indicator. In some examples, the engine-off event may be indicated by the vehicle switching to a battery-only mode, or a deceleration-fuel shut-off (DFSO) mode. If no engine-off event has been detected, method 600 may proceed to 615. At 615, method 600 includes maintaining the status of the engine, exhaust, and emissions control systems. Method 600 may then end.

If an engine-off event is detected, method 600 proceeds to 620. At 620, method 600 includes determining whether an exhaust catalyst temperature is above a threshold. For example, the threshold may be based on a temperature indicative of a catalyst activation temperature (e.g., light-off temperature). In some examples, the threshold may be further based on ambient conditions, and/or other conditions that may cause the catalyst temperature to decrease below the catalyst activation temperature within a duration of the vehicle-off event. In examples where the exhaust catalyst includes a cooling subsystem configured to reduce the exhaust catalyst temperature following the vehicle-off condition, such as an engine coolant circuit, thermoelectric cooler, etc., the cooling subsystem may be maintained off. The exhaust catalyst temperature may be measured via a dedicated exhaust catalyst temperature sensor, or estimated or inferred based on operating conditions, such as exhaust temperature, engine coolant temperature, and/or engine conditions during the most recent drive cycle preceding the vehicle-off event. If the exhaust catalyst temperature is below the threshold, method 600 proceeds to 630. At 625, method 600 includes placing the controller in a sleep mode, and aborting the method. Method 600 may then end.

If the exhaust catalyst temperature is above the threshold, method 600 proceeds to 635. At 635, method 600 includes closing the throttle, opening the CPV, and activating the ELCM pump in a pressure mode. For example, referring to FIG. 2, throttle 262 may be closed completely, while CPV 261 is opened, thus coupling ELCM 295 to the engine intake. ELCM 295 may then be placed in a conformation to pressurize the engine intake, which may include placing a changeover valve in position to couple canister 222 to atmosphere via the ELCM pump, and opening (or maintaining open) CVV 297. The ELCM vacuum pump may then be turned on in a pressure mode, introducing fresh air to the fuel vapor canister, purge line, and engine intake. In this way, hydrocarbons adsorbed by the fuel vapor canister and AIS HC trap may be desorbed and pressurized in the engine intake. This conformation may be maintained for a predetermined duration, or a duration based on current operating conditions. For example, a canister temperature sensor may be used to determine hydrocarbon desorption within the canister. A temperature plateau may indicate that hydrocarbons are no longer being desorbed, and the controller may infer that the AIS hydrocarbon trap is sufficiently purged. In examples where the engine intake is coupled to the engine exhaust via an EGR system (e.g., EGR system 530 depicted in FIG. 5), an EGR valve may be opened, thus driving the desorbed hydrocarbons as well as any residual exhaust in the EGR system to the exhaust catalyst, where the gasses may be converted into molecules with reduced toxicity. If the exhaust system includes an exhaust or backpressure throttle downstream of the exhaust catalyst, such a throttle may be opened to allow for emission of the converted gasses exiting the exhaust catalyst.

Continuing at 635, method 600 includes spinning the engine unfueled. For example, an electric motor, such as a starter motor may be operated to spin the engine. The controller may be configured to disable spark and fuel injection. The throttle may be placed or maintained in a partially open position to prevent an intake vacuum from developing. The engine may be spun unfueled for a predetermined duration, or for a duration based on current operating conditions. For example, the engine may be spun unfueled until it reaches a pre-determined temperature, such as a temperature where liquid fuel trapped within an engine cylinder is likely to be vaporized. The engine may be spun at a relatively low speed, for example at idling speed or lower, but may be spun at a higher speed if more heat generation is necessary (e.g., ambient temperatures are below a threshold).

Continuing at 640, method 600 includes stopping the engine spinning in a position where a first cylinder intake valve and exhaust valve are open. For example, FIG. 4 shows cylinder 314 in a position with valves 350 and 356 opened. Engines with mechanically activated valves may require the engine to be stopped in a specific position to open the intake valve for the first cylinder, whereas engines with electrically activated valves may be able to open an intake valve from a plurality of engine positions. In some examples, more than one cylinder may be positioned with open intake and exhaust valves. The first cylinder or cylinders may be preselected, or may be selected based on operating conditions. For example, for variable displacement engines, if an engine cylinder was deactivated during a previous drive cycle, that cylinder may not be selected as the first cylinder to be purged. The positioning of the first engine cylinder with the intake and exhaust valves open may occur immediately following an engine-off event, as described with regard to 610, without any engine starts or stops therebetween. In some examples, this may occur only while the vehicle is stationary. In some examples, this may occur only when the vehicle is moving, but while the engine is not providing any torque to drive the wheels, and while the engine is not generating any wheel braking torque.

Continuing at 645, method 600 may include purging the first cylinder to the fuel vapor canister. For example, the CPV may be opened, the throttle may be closed, and the ELCM may be placed in a conformation to pressurize the engine intake. The ELCM vacuum pump may then be turned on, introducing fresh air to the one or more cylinders positioned with an open intake valve. In this way, vaporized, uncombusted fuel may be drawn out of the cylinders and be directed to the exhaust catalyst. Hydrocarbons desorbed from the fuel vapor canister and AIS hydrocarbon trap may also be directed to the exhaust catalyst, if not done so as described with reference to 630. This conformation may be maintained for a predetermined duration, or a duration based on current operating conditions. The CPV may then be closed, the ELCM pump turned off, and the throttle and ELCM restored to default positions.

Continuing at 650, method 600 may include repeating the intake valve positioning and purge routine for each remaining cylinder. One or more cylinders may sequentially be placed into a position with an intake valve open, and the throttle, CPV, and ELCM placed in a conformation to purge the cylinders as described for the first cylinder, and the ELCM pump turned on in a pressure mode. The purge conformation may be maintained for a duration, then default positions restored. The process may then be repeated for the remaining cylinders. As described above, for variable displacement engines, if an engine cylinder was deactivated during a previous drive cycle, that cylinder may not be selected to be purged. The order of cylinder purging may thus be pre-determined or based on operating conditions. Each engine cylinder may be positioned in the purge conformation via operation of an electric motor, and without performing any combustion in each engine cylinder to perform the positioning.

Continuing at 655, method 600 may include returning the cylinders and actuators to a default vehicle-off conformation. For example, the engine cylinders may be rotated into a position that would be used for engine start-up, and cylinder valves opened or closed accordingly. The CPV may be closed, the throttle placed in a default position, the ELCM placed in a default position, the ELCM pump turned off, and the EGR valve closed (where applicable).

Continuing at 660, method 600 may include updating the canister load and canister purge schedule. For example, the controller may update the canister load to reflect the quantity of hydrocarbons desorbed during the engine and exhaust purging operations, and the canister purge schedule may be updated based on the updated canister load. Continuing at 665, method 600 may include placing the controller in a sleep mode. Method 600 may then end.

FIG. 7 depicts an example timeline 700 for purging hydrocarbons to an exhaust catalyst following an engine-off event using the method described herein and with reference to FIG. 6. Timeline 700 includes plot 705, indicating an engine status over time, and plot 710, indicating an exhaust catalyst temperature over time. Line 712 indicates a light-off temperature for the exhaust catalyst. Timeline 700 further includes plot 715, indicating a throttle position over time, plot 720, indicating a CPV status over time, plot 725, indicating the status of an ELCM pump over time, and plot 730, indicating the status of an electric motor configured to rotate the engine over time. Timeline 700 further includes plot 735, indicating the status of a first engine cylinder intake valve over time, and plot 740, indicating the status of a first engine cylinder exhaust valve over time. Timeline 700 further includes plot 745, indicating the status of a second engine cylinder intake valve over time, and plot 750, indicating the status of a second engine cylinder exhaust valve over time. Timeline 700 further includes plot 755, indicating a fuel vapor canister load over time. For brevity, timeline 700 is described with regard to purging two engine cylinders, but it should be understood that the first engine cylinder and second engine cylinder may represent a first group of engine cylinders and second engine cylinders, and/or that timeline 700 could be extended to encompass the purging of a plurality of engine cylinders. In this example, the engine system does not include an EGR system or an exhaust throttle. In describing the status of the ELCM pump, it may be assumed that an ELCM changeover valve is in placed in a position to couple the vent line to atmosphere via the pump when the pump is turned on. A canister vent valve may thus be assumed to be open or omitted for the duration of timeline 700.

At time $t_0$, the engine is on, as indicated by plot 705. As indicated by plot 710, the exhaust catalyst temperature is above the light-off temperature represented by line 712. The throttle is open, as indicated by plot 715, the CPV is closed, as indicated by plot 720, the ELCM pump is off, as indicated by plot 725, and the electric motor is off, as indicated by plot 730. The engine is maintained on from time $t_0$ to time $t_1$. Accordingly, the intake and exhaust valves for the $1^{st}$ and $2^{nd}$ cylinders are opened and closed based on engine rotation and combustion, as shown by plots 735, 740, 745, and 750. The throttle is gradually shifted from a wide-open position towards a closed position as the vehicle approaches an engine-off condition.

At time $t_1$, the engine is turned off, and the throttle is gradually closed. At time $t_2$, the exhaust catalyst temperature remains above the light-off temperature and thus conditions for purging residual hydrocarbons and exhaust to the exhaust catalyst are met. Accordingly, the throttle is maintained closed, the CPV is opened, and the ELCM pump is turned on in a pressure mode. As such, fresh air is pumped through the fuel vapor canister vent and into the engine intake, thus desorbing hydrocarbons from the fuel vapor canister, and decreasing the fuel vapor canister load, as indicated by plot 755. Further, the electric motor is turned on, rotating the engine unfueled, while the intake and exhaust valves for the $1^{st}$ and $2^{nd}$ cylinders are maintained closed.

At time $t_3$, the electric motor is turned off, and the intake and exhaust valves for the $1^{st}$ cylinder are opened, thus coupling the engine intake to the engine exhaust via the $1^{st}$ engine cylinder. In this conformation, the hydrocarbons desorbed from the fuel vapor canister as well as residual fuel in the $1^{st}$ cylinder are directed to the exhaust catalyst, where they are reacted. The fuel vapor canister load decreases further.

At time $t_4$, the intake and exhaust valves for the $1^{st}$ cylinder are closed, and the electric motor is turned on. At time $t_5$, the electric motor is turned off, and the intake and exhaust valves for the $2^{nd}$ cylinder are opened, thus coupling the engine intake to the engine exhaust via the $2^{nd}$ engine cylinder. In this conformation, any residual hydrocarbons desorbed from the fuel vapor canister as well as residual fuel in the $2^{nd}$ cylinder are directed to the exhaust catalyst, where they are reacted.

At time $t_6$, the intake and exhaust valves for the $2^{nd}$ cylinder are closed. At time $t_7$, the engine system is returned to a default conformation. Accordingly, the CPV is closed, the ELCM pump is turned off, the electric motor is maintained off, and the throttle is opened to relieve intake vacuum.

The systems described herein and depicted in FIGS. 1-5 along with the method described herein and depicted in FIG. 6 may enable one or more systems and one or more methods. In one example, a method for an engine is provided, comprising following an engine-off event, positioning a first engine cylinder with an intake valve open and an exhaust valve open and purging contents of the first engine cylinder to an exhaust catalyst. In this way, uncombusted hydrocarbons and residual exhaust can be converted into less toxic molecules rather than potentially being emitted to atmosphere. In such an example, the method may additionally or alternatively comprise following purging contents of the first engine cylinder to the exhaust catalyst, positioning a second engine cylinder with an intake valve open and an exhaust valve open, and purging contents of the second engine cylinder to the exhaust catalyst. In embodiments where the second engine cylinder is purged to the exhaust catalyst, the method may additionally or alternatively comprise following purging contents of the second engine cylinder to the exhaust catalyst, sequentially positioning each remaining unpurged engine cylinder with an intake valve open and an exhaust valve open via operation of an electric motor and without performing any combustion in each engine cylinder to perform the positioning, sequentially purging contents of each unpurged engine cylinder to the exhaust catalyst, and following purging contents of each engine cylinder, restoring the engine to a default, engine-off position. In any of the preceding embodiments, the method may additionally or alternatively comprise prior to positioning the first engine cylinder with an intake valve open and an exhaust valve open, spinning the engine unfueled for a duration. In any of the preceding embodiments, purging contents of the first engine cylinder may additionally or alternatively comprise closing a throttle, opening a canister purge valve, and activating an air pump coupled between a fuel vapor canister and atmosphere. In any of the preceding embodiments where the method includes an air pump coupled between the fuel vapor canister and atmosphere, activating an air pump coupled between the fuel vapor canister and atmosphere may additionally or alternatively comprise coupling the fuel vapor canister to atmosphere via the air pump. In any of the preceding embodiments where the method includes an air pump coupled between the fuel vapor canister and atmosphere the method may additionally or alternatively comprise, closing the throttle, opening the canister purge valve, and purging contents of an air intake system hydrocarbon trap and the fuel vapor canister to the exhaust catalyst. In any of the preceding embodiments where the contents of the air intake system hydrocarbon trap and the fuel vapor canister are purged to the exhaust catalyst, purging contents of an air intake system hydrocarbon trap and the fuel vapor canister to the exhaust catalyst may additionally or alternatively comprise positioning an engine cylinder with an intake valve open and an exhaust valve open. In any of the preceding embodiments where the contents of the air intake system hydrocarbon trap and the fuel vapor canister are purged to the exhaust catalyst, purging contents of an air intake system hydrocarbon trap and the fuel vapor canister to the exhaust catalyst may additionally or alternatively comprise opening an exhaust gas recirculation valve. The technical result of implementing this system is a removal of residual exhaust and uncombusted hydrocarbons from an engine following an engine-off event that does not require additional hardware to be added to the vehicle, thus reducing emissions without increasing manufacturing costs.

In another example, a system for a vehicle is provided, the system comprising an engine comprising one or more cylinders, each cylinder comprising an intake valve and an exhaust valve, an exhaust catalyst coupled to an engine exhaust, a fuel vapor canister coupled to an engine intake via a canister purge valve, a throttle coupled between the engine intake and atmosphere, an air pump coupled between the fuel vapor canister and atmosphere, and a controller configured with instructions stored in non-transitory memory, that when executed cause the controller to: following an engine-off event, position a first engine cylinder with an intake valve open and an exhaust valve open, close the throttle, open the canister purge valve, turn the air pump on, and purge contents of the first engine cylinder to the exhaust catalyst. In such an example, the controller may additionally or alternatively be configured with instructions stored in non-transitory memory, that when executed cause the controller to: following purging contents of the first engine cylinder to the exhaust catalyst, position a second engine cylinder with an intake valve open and an exhaust valve open, close the throttle, open the canister purge valve, turn the air pump on, and purge contents of the second engine cylinder to the exhaust catalyst. In embodiments where the contents of a second engine cylinder are purged to the exhaust catalyst, the controller may additionally or alternatively be configured with instructions stored in non-transitory memory, that when executed cause the controller to: following purging contents of the second engine cylinder to the exhaust catalyst, sequentially position each remaining unpurged engine cylinder with an intake valve open and an exhaust valve open, close the throttle, open the canister purge valve, turn the air pump on, sequentially purge contents of each unpurged engine cylinder to the exhaust catalyst, and following purging contents of each engine cylinder, restore the engine to a default, engine-off position. In any of the preceding embodiments, the system may additionally or alternatively comprise an electric motor coupled to the engine, and the controller may additionally or alternatively be configured with instructions stored in non-transitory memory, that when executed cause the controller to: prior to positioning the first engine cylinder with an intake valve open and an exhaust valve open, spin the engine unfueled for a duration. In any of the preceding embodiments, the system may additionally or alternatively comprise an air intake system hydrocarbon trap, and the controller may additionally or alternatively be configured with instructions stored in non-transitory memory, that when executed cause the controller to: close the throttle, open the canister purge valve, turn on the air pump, and purge contents of the air intake system hydrocarbon trap and the fuel vapor canister to the exhaust catalyst. In any of the preceding embodiments wherein the contents of the air intake system hydrocarbon trap and the fuel vapor canister are purged to the exhaust catalyst, purging contents of the air intake system hydrocarbon trap and the fuel vapor canister to the exhaust catalyst may additionally or alternatively comprise positioning an engine cylinder with an intake valve open and an exhaust valve open. In any of the preceding embodiments, the system may additionally or alternatively comprise an exhaust gas recirculation passage coupled between the engine exhaust and the engine intake and an exhaust gas recirculation valve coupled within the exhaust gas recirculation passage. In any of the preceding embodiments comprising an exhaust gas recirculation valve, and wherein the contents of the air intake system hydrocarbon trap and the fuel vapor canister are purged to the exhaust catalyst, purging contents of the air intake system hydrocarbon trap and the fuel vapor canister to the exhaust catalyst may additionally or alternatively comprise opening the exhaust gas recirculation valve. In any of the preceding embodiments, the air pump may additionally or alternatively comprise a reversible air pump. In any of the preceding embodiments, the air pump may additionally or alternatively be housed within an evaporative leak check module. The technical result of implementing this system is a removal of residual exhaust and uncombusted fuel from an engine without further loading the fuel vapor canister. In this way, bleed emissions may be reduced.

In yet another example, a method for a hybrid-electric vehicle is provided, the method comprising following an engine-off condition, and responsive to an exhaust catalyst temperature being greater than a threshold, spinning an engine unfueled for a duration, stopping the engine spinning with a first engine cylinder positioned with an intake valve open and an exhaust valve open, applying air pressure to the first engine cylinder, purging contents of the first engine cylinder to an exhaust catalyst, positioning the engine with a second engine cylinder positioned with an intake valve open and an exhaust valve open, applying air pressure to the second engine cylinder, purging contents of the second engine cylinder to the exhaust catalyst, sequentially positioning the engine with each remaining unpurged cylinder with an intake valve open and an exhaust valve open, sequentially applying air pressure to each unpurged cylinder, sequentially purging contents of each unpurged engine cylinder to the exhaust catalyst, and following purging contents of each engine cylinder to the exhaust catalyst, restoring the engine to a default engine-off position. In such an example, the method may additionally or alternatively comprise coupling an engine exhaust to an engine intake, coupling the engine intake to a fuel vapor canister, applying air pressure to the fuel vapor canister, and purging contents of the fuel vapor canister to the exhaust catalyst. The technical result of implementing this method is that the engine and fuel vapor catalyst are evacuated and reset upon the next engine-on event. In this way, the engine does not need to be forced on to purge the fuel vapor canister, thus improving fuel economy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
following an engine-off event, positioning a first engine cylinder with an intake valve open and an exhaust valve open by operating an electric motor to spin the engine unfueled: and
purging contents of the first engine cylinder to an exhaust catalyst by operating a pump coupled to a fuel vapor canister coupled to the engine.

2. The method of claim 1, further comprising:
following purging contents of the first engine cylinder to the exhaust catalyst, positioning a second engine cylinder with an intake valve open and an exhaust valve open; and
purging contents of the second engine cylinder to the exhaust catalyst.

3. The method of claim 2, further comprising;
following purging contents of the second engine cylinder to the exhaust catalyst, sequentially positioning each remaining unpurged engine cylinder with an intake valve open and an exhaust valve open via operation of an electric motor and without performing any combustion in each engine cylinder to perform the positioning;
sequentially purging contents of each unpurged engine cylinder to the exhaust catalyst; and
following purging contents of each engine cylinder, restoring the engine to a default, engine-off position.

4. The method of claim 1, further comprising:
prior to positioning the first engine cylinder with the intake valve open and the exhaust valve open, spinning the engine unfueled for a duration.

5. The method of claim 1, wherein purging contents of the first engine cylinder comprises:
closing an intake throttle;
opening a canister purge valve; and activating the pump coupled between the fuel vapor canister and atmosphere.

6. The method of claim 5, further comprising:
closing the intake throttle;
opening the canister purge valve; and
purging contents of an air intake system hydrocarbon trap and the fuel vapor canister to the exhaust catalyst.

7. The method of claim 6, wherein purging contents of the air intake system hydrocarbon trap and the fuel vapor canister to the exhaust catalyst comprises:
positioning an engine cylinder with an intake valve open and an exhaust valve open.

8. The method of claim 6, wherein purging contents of the air intake system hydrocarbon trap and the fuel vapor canister to the exhaust catalyst comprises:
opening an exhaust gas recirculation valve.

* * * * *